United States Patent [19]
Alperin et al.

[11] 3,741,054
[45] June 26, 1973

[54] MATERIAL THICKNESS DETECTOR

[75] Inventors: Joel M. Alperin, Scranton; James P. Murphy, Pittston, both of Pa.

[73] Assignee: Philadelphia College of Textiles and Science, Philadelphia, Pa.

[22] Filed: Oct. 26, 1971

[21] Appl. No.: 192,441

[52] U.S. Cl.................. 83/80, 83/106, 83/360, 83/361, 200/61.13, 209/88 S
[51] Int. Cl...... B65h 7/06, B65h 29/62, B65h 35/06
[58] Field of Search.................. 83/80, 106, 360, 83/361; 200/61.13; 209/88 S

[56] References Cited
UNITED STATES PATENTS

| | | | |
|---|---|---|---|
| 3,462,568 | 8/1969 | Smith | 200/61.13 |
| 2,293,500 | 8/1942 | Fox | 209/88 S X |
| 3,581,402 | 6/1971 | London et al. | 209/88 S |

Primary Examiner—J. M. Meister
Attorney—Henry N. Paul, Jr., Albert W. Preston, Jr. et al.

[57] ABSTRACT

Detector apparatus for detecting thickness variations of a continuous strip of material, adapted to detect relative variations in excess of a given percentage of the desired reference thickness, and further adapted to be self-adjusting to detect, with a substantially constant sensitivity, thickness variations with respect to any reference thickness of the passing material which is substantially uniform for more than a predetermined length. A cam with a symmetrical surface is positioned between a pair of switches, and carried by a rotatable arm which is responsive to thickness variations. The pivot position of the rotatable arm is normally held fixed, and is changeable in position only when the passing material changes to and maintains a different thickness for more than a given length.

24 Claims, 6 Drawing Figures

Patented June 26, 1973

INVENTORS,
JOEL M. ALPERIN
JAMES P. MURPHY

BY

Paul & Paul

ATTORNEYS.

Patented June 26, 1973

INVENTORS.
JOEL M. ALPERIN
JAMES P. MURPHY

BY Paul & Paul

ATTORNEYS.

MATERIAL THICKNESS DETECTOR

BACKGROUND OF THE INVENTION

1. Field of the Invention

This invention lies in the field of material thickness detectors and, more particularly, detectors which are self-adjusting to detect relative thickness variations with respect to a changeable material thickness reference.

2. Description of the Prior Art

There are many industrial areas where it is of critical importance to be able to accurately detect the relative thickness of a material that is being processed. This need inherently arises in any manufacturing operation where the thickness of a material being processed must be controlled in its permissible variations. One such industrial procedure, to which the invention of this application is directly applicable, is in making the belt loops for men's trousers. In the factory making men's trousers, whether they are of the slack variety or part of a tailored suit, the standard procedure is to run a sewn strip of belt loop material through a cutting machine which has been set to cut predetermined lengths, which lengths will be converted into trouser loops. Since the strips are sewn from relatively short lengths of garment fabric, there are many seams where one piece overlaps the other, or where no fabric surrounds the strip filler. Consequently, under present practice, after these pieces are cut it is necessary for a worker to examine them and sort out the bad ones from the good ones, the bad ones being defined as having impermissible thickness variations. Aside from the time and expense of such a manual inspection, the procedure is not reliable, as there are necessarily some belt loop lengths with hidden seams or defects which are not readily observable.

In the present practice, a standard belt loop cutting machine is utilized, which is adapted to cut standard lengths, and which is equipped with a detection device. However, the detection device used with the standard cutting machine is not self adjusting, in that it has to be specifically set to the desired material thickness. Such standard detectors are adaptable only to detect minimum and maximum thicknesses. Whenever the cutter is to be employed to operate on material of another thickness, it must be shut down so that the detector may be mechanically reset to operate on the different material having a different nominal thickness. This is a serious handicap in many industrial operations, and particularly in the belt loop cutting operation, where the machine operator frequently desires to go quickly from one fabric to another without adjusting the machine.

Additional economic consequences of inaccurate thickness detection arise during the trouser-making steps which follow the cutting operation. One end of the cut loop is sewn into the waistband portion of the trouser, and on a subsequent operation the other end of the loop is tacked onto the finished trouser. Upon either of the first or second sewing of the loop into the garment, it is examined by an operator. If a faulty loop is not caught before the actual sewing operation, it is possible to break a needle and/or seriously damage the garment being operated upon. Thus, the required inspecting operations, done at different points, as well as damage to the garment and down time due to needle breakage, add substantially to the cost of overall operation and decrease the productivity of the sewing machine operator. There is thus a great commercial need in this specific area for a machine which accurately detects bad belt loop lengths and causes same to be rejected, and which is automatically adjustable to accommodate various thicknesses of belt loop material.

SUMMARY OF THE INVENTION

It is an object of this invention to provide detector apparatus capable of detecting relative thickness of a passing material, and adapted to be self adjusting to non-transient thickness variations of the material so as to continuously detect the same relative thickness variations.

It is a further object of this invention to provide thickness detector apparatus which monitors the thickness of a passing material and which is operative to cause discrimination between good lengths of said passing material having no relative thickness variations greater than a predetermined amount, and bad lengths of said passing material having at least one relative thickness variation greater than said predetermined amount.

It is yet another object of this invention to provide material thickness detector apparatus having a detection sensitivity which remains substantally constant as a function of the material thickness, and wherein such sensitivity is adjustable over a wide percentage range.

It is yet a further object of this invention to provide material thickness detector apparatus which is adaptable to sense relative thickness variations in materials of a wide variety of compositions and thicknesses, and which is accurate, reliable, and automatically self adjusting to changes in the material being detected.

In accordance with the above objectives, the apparatus of this invention comprises detector apparatus for detecting thickness variations of a continuous strip of material, adapted to detect relative variations in excess of a given percentage of the desired reference thickness, and further adapted to be self adjusting to detect, with a substantially constant sensitivity, thickness variations with respect to any reference thickness of the passing material which is substantially uniform for more than a predetermined length. A pair of rollers, spaced apart by a predetermined distance, carry respective legs connected together at a normally fixed pivot point. A first leg is freely pivotable, and the second leg is non-pivotable. A cam with a symmetrical surface is positioned between a pair of switches, and is carried by a rotatable arm integrally connected to the first leg. The pivotable first leg, rotatable arm and cam combine to transmit relative thickness variations exceeding a given level to the switches. The pivot point is changeable in position only when the passing material changes to and maintains a different thickness for at least the length between the rollers. In the preferred embodiment, the monitored material is a continuous textile strip which is continuously cut into predetermined lengths, and electrical signals from the switches are connected to control circuitry adapted to cause passage or rejection of such predetermined lengths on the basis of whether each such length contains a thickness variation in excess of the detection level of the apparatus.

DESCRIPTION OF THE PREFERRED EMBODIMENT

Figure 1:
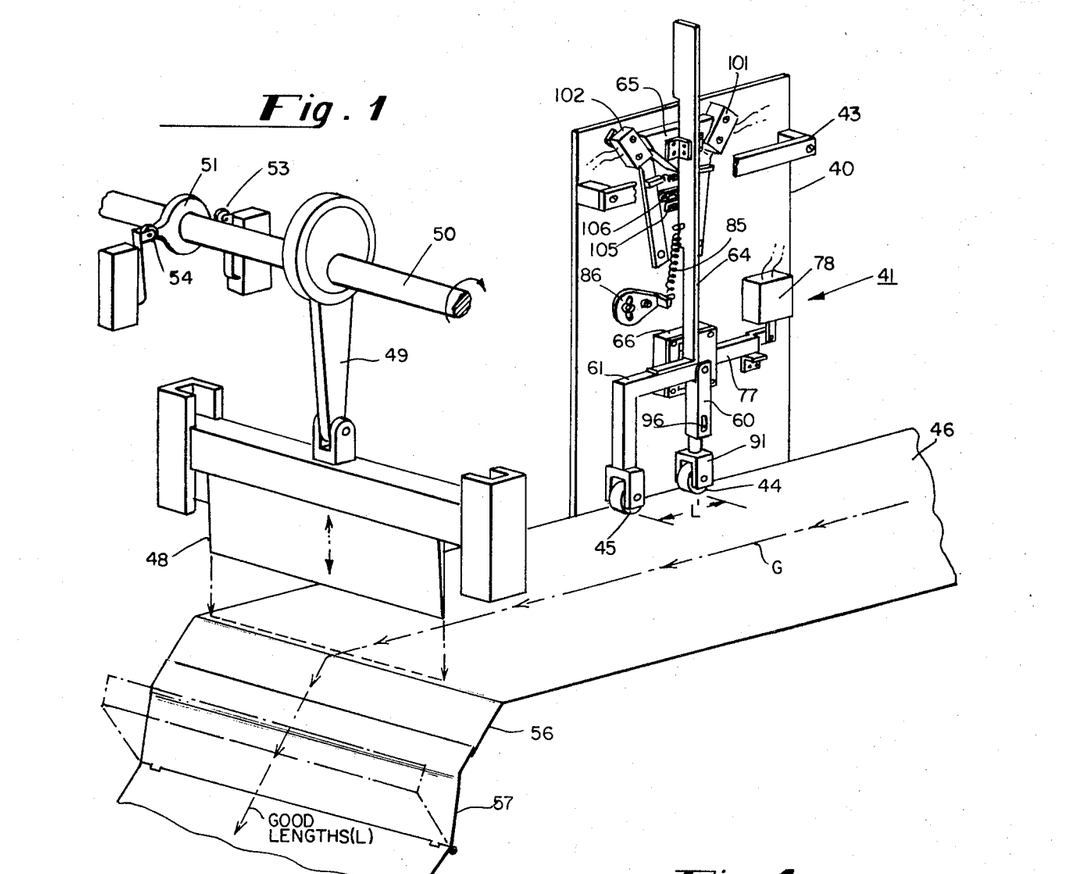
FIG. 1 is a schematic perspective view of the mechanical portion of the detector in combination with a cutting mechanism and a detector-controlled reject door.
Figure 6:
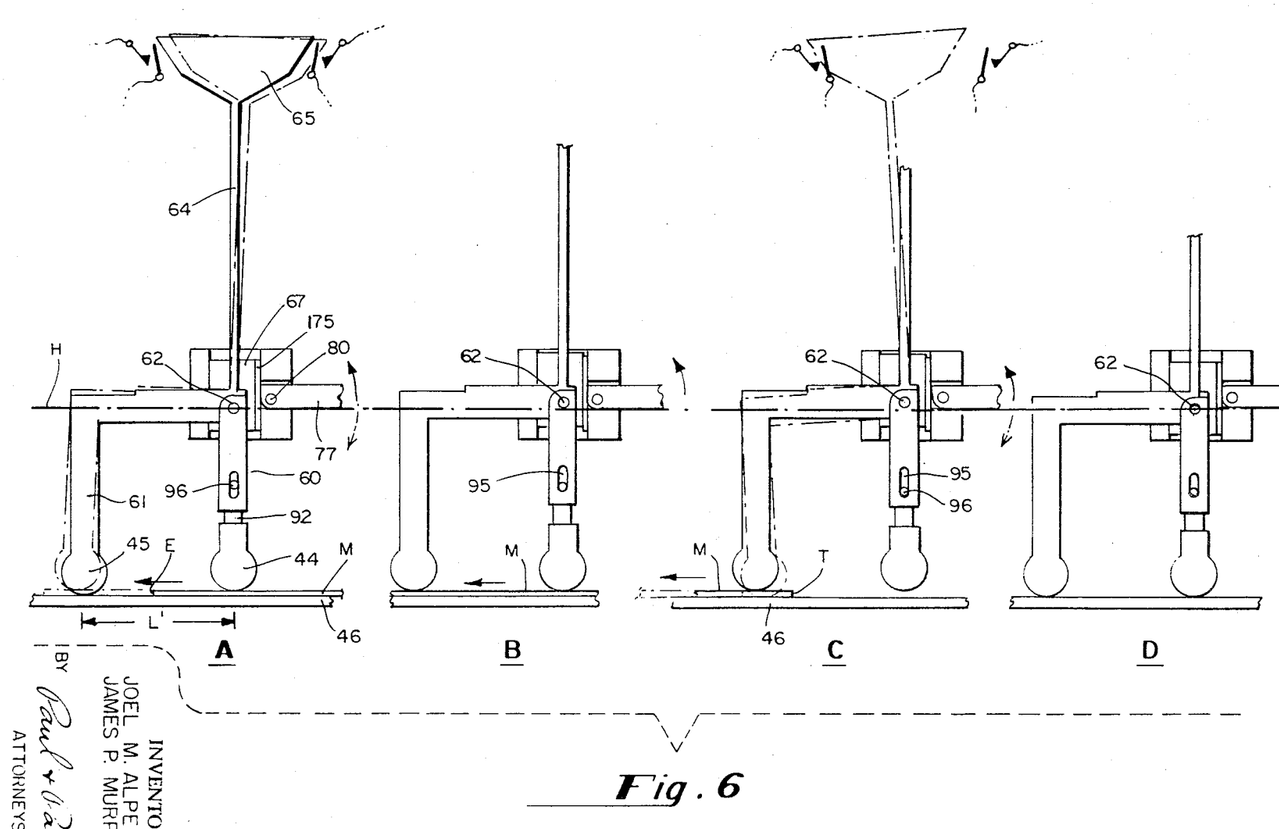
FIG. 6 is a schematic representation of the movement of the mechanical detector in response to varying material thicknesses.

Referring now to FIG. 1, the mechanical detector of this invention, shown generally as 41, is illustrated in relation to a platform 46 on which a continuous strip of material is conveyed. The material, designated M in FIG. 6, is moved continuously along platform 46 by any suitable supply or transport system, not shown in the drawings. For example, where the material M constitutes a continuous strip of textile material, the thickness of which is to be monitored, such strip is advanced through feed rollers which may be positioned before and/or after the mechanical detector 41. As stated above, cutter mechanisms adapted to feed a strip of textile material and cut it into predetermined lengths are commercially available, and applicant makes no claim over such apparatus. Similarly, for other types of materials which are to be operated upon, the moving force may be supplied by an extruder or like mechanism. Depending upon the material being monitored, suitable guide pieces, not shown, may be employed to maintain the material in constant advancement underneath the detector rollers.

In the application of the preferred embodiment as here illustrated, the material operated upon is a continuous strip of belt loop material, comprising a fabric wrapped around a center filler material and stitched together on one side of the loop or all the way through the material. In practice, the material strip will have imperfect portions, such as where double thicknesses of fabric have been stitched around the filler, or no fabric has been stitched around the filler, which portions are manifested by varying thickness. In this application, the fabric strip is transported along platform 46 and, after passing by detector 41, is periodically cut or chopped by cutter 48, to produce precisely predetermined lengths which may be used in the production of belt loops. Cutter 48 is driven by cutter axle 50 through linkage 49. Axle 50 is connected to and driven by the feed mechanism through drive means not shown, so that the material is cut periodically upon the passage of every pre-determined length L of material. The length L can, of course, be varied by suitable gearing of the drive means.

Having detected imperfections in the monitored material, the apparatus automatically rejects any cut length which contains one or more such imperfection. This is accomplished by transmitting a signal from detector 41 which activates hinged door 57 to capture, and thereby prevent passage to a receiving station, any such lengths containing an imperfection. Thus, in the preferred embodiment illustrated, the material is first detected as at 41, then cut into pre-determined lengths by cutter 48, and either passed on to a receiving station or rejected.

While the perferred embodiment is here illustrated as acting on a continuous strip of fabric material, it is readily appreciated that there is no limit imposed on the types of materials which can be so detected and operated on. The sensitivity of the detector unit is essentially unlimited, and it can be adapted to detecting relative thickness differences in a wide variety of passing materials. Further, it is well understood that in place of the cutter as illustrated, other instruments may be activated to operate on the material. For example, marking devices, such as dye markers, may be utilized to indicate the detected points of thickness variation.

Referring more specifically to the detail of the mechanical portion of the detector, as illustrated in FIGS. 1–4, there is seen a pair of detector rollers, each of which is susceptible of vertical displacement as the material passes between it and platform 46. The garment material, or whatever material is being monitored, is transported along path G, which is understood to take it under the two rollers. Stationary detector roller 44 is connected to and carried by a stationary detector roller leg indicated generally at 60, which is comprised of upper leg 90, lower leg 91, and inner leg 92. Inner leg 92 is integrally connected to lower leg 91, and extends upward and is received into inner cylinder chamber 93 within upper leg 90. A leg spring 94 is positioned within chamber 93, impeding movement of inner leg 92 upward within the chamber. Upper leg 90 contains a vertical slot opening 95, through which extends a protruding pin 96 integrally connected to inner leg 92. Slot opening 95 and pin 96 permit vertical movement of lower leg 91 with respect to upper leg 90, but prevent any rotational movement of inner leg 92 within chamber 93. Thus, in response to varying thicknesses of a material M (FIG. 6) interposed between wheel 44 and platform 46, wheel 44 is permitted to move vertically with respect to upper leg 90. The conditions under which upper leg 90 is permitted to move are described in detail hereinbelow.

Movable detector roller 45 is connected to and carried by movable detector roller leg 61, which is generally L-shaped and connected at its other end to stationary detector roller leg 60 by detector roller leg pivot screw 62. As seen more particularly in FIGS. 3 and 4, movable leg 61 and stationary leg 60 have registering hinge portions at the pivot point indicated by screw 62. The stationary leg 60 has dual hinge pieces 59, with the space therebetween filled by inner hinge piece 63 extending from leg 61. Pieces 59 and 63 have circular openings therethrough aligned to receive pivot screw 62, about which they may be pivoted relative to each other.

Leg 61 has integrally connected, on the top horizontal portion thereof, an L-shaped movable detector arm 64. The vertical portion of detector arm 64 carries, toward its upper end, a switch detector cam 65 which is connected thereto by brackets 73. Cam 65, as seen from the side elevation of FIG. 2, has a cam surface 75 which is bilateral and symmetrical with respect to the vertical portion of movable detector arm 64, such that respective opposite side surfaces of the cam are inclined at equal angles with respect to arm 64. A spring 85 is connected between a point on arm 64 and spring tension adjuster 86, to provide a continuous force tending to pull arm 64 to the left to maintain leg 61 in continuous contact with the material.

Figure 2:
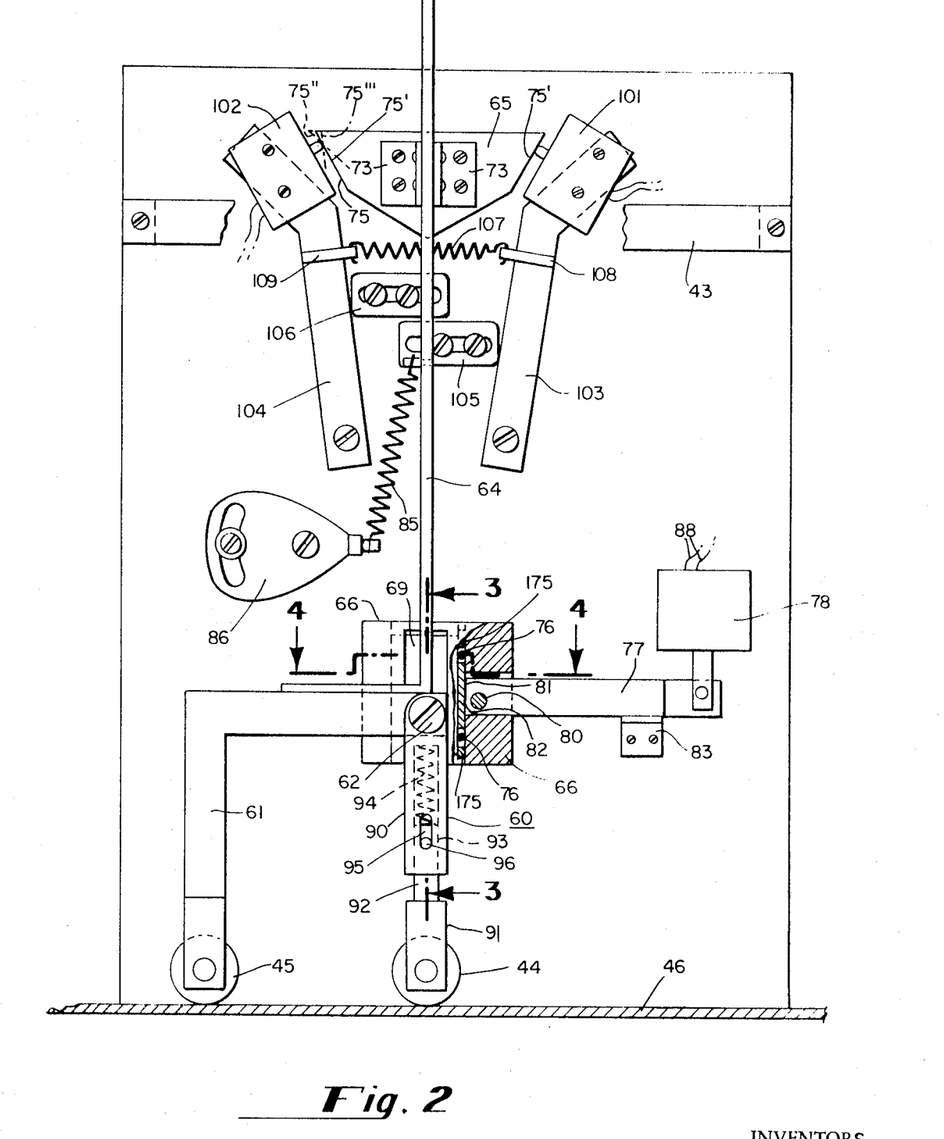
FIG. 2 is a side elevation view of the mechanical portion of the detector mechanism of this invention.

It is thus seen that under normal circumstances, with rollers 44 and 45 being displaced equally from platform 46, arm 64 is aligned vertically and normal to platform 46. However, in response to any vertical movement of wheel 45, causing an angular displacement of arm 61, detector arm 64 is rotated through a like angular displacement, causing lateral displacement of cam 65 to the left or right of the vertical center line through pivot screw 62. For reasons set forth below, vertical displacement of roller 44 does not cause any lateral displacement of cam 65.

Right microswitch 101 and left microswitch 102 are positioned to the right and left respectively of cam 65, and are positioned symmetrically with respect to the vertical line through pivot point 62. Switches 101 and 102 are conventional, mechanically activated microswitches, and are mounted on right pivot arm 103 and left pivot arm 104 respectively. Pivot arms 103 and 104 are pivotable about screws 143 and 144 respectively, and are interconnected by microswitch arm spring 107, which is held by right spring clamp 108 and left spring clamp 109. In practice, and slight displacement of cam 65 to the right or left will immediately cause contact of the cam with the right or left microswitch, causing actuation of such switch. However, each switch has the property of over-travel, such that if cam 65 is displaced angularly more than a sufficient distance to cause actuation of the switch, the switch is free to move in response to the force of the cam. Upon return of arm 64 and cam 65 to the normally vertical position, the displaced pivot arm 103 or 104 returns to its normal position, as established by switch stops 105 and 106 respectively, such that the switch is also returned to its normal position.

From the above, it is seen that any vertical displacement of movable roller 45, up or down, produces a lateral displacement of cam 65 which may activate one of the microswitches. In this manner, any pre-determined differential thickness of the material is detected. As described hereinbelow, the detector may be further adapted to detect minimum and maximum thicknesses, so that any lengths having thicknesses outside of such limits will be rejected.

It is appreciated that the length of arm 64, the shape of cam 65, and the positions of switches 101 and 102 relative thereto may be adjusted to achieve virtually any desired sensitivity of the detector to the vertical movement of roller 45. For example, by lengthening arm 64, the distance of travel to the left or the right of cam 65, corresponding to a given angular movement of movable roller leg 61, will be increased. Brackets 103 and 104 may be positioned, by adjustment of right and left stops 105 and 106 respectively, so that switches 101 and 102 are actuated after any desired differential movement of cam 65, corresponding to any predetermined variance of the thickness of the material passing under roller 45. For example, if the contacts of switches 101 and 102 are placed virtually flush with the surfaces of cam 65, any vertical displacement of roller 45, either up or down, will cause actuation of one of the switches. On the other hand, if each of the switches is displaced laterally away from the vertical axis through pivot point 62, cam 65 will necessarily have to move a greater distance before contacting either switch, such that a greater thickness variation will be necessary to cause actuation of either switch.

As illustrated, with the microswitches displaced symmetrically to the left and right of the vertical through pivot screw 62, the detector is equally sensitive to increases and decreases of material thickness. Of course, by positioning the switches asymmetrically, an unbalanced sensitivity may be achieved. In the preferred embodiment, cam 65 is manufactured to a tolerance of ± 0.005 inches, it being understood that sensitivity is also affected by this parameter.

Another important feature of the detector of this invention is that it maintains a detection level, or detection sensitivity, which is directly proportional to the thickness of the material being monitored. In other words, the detector can be adjusted so that it detects a given percentage variation for substantially any thickness of the monitored material within the minimum and maximum limits of detection. For example, if the detector is set at 50 percent sensitivity, and the thickness of the material is nominally ⅛ of an inch, variations in thickness of more than 1/16 of an inch, up or down, are detected. If the monitored material is nominally ¼ of an inch thick, variations of ⅛ inch or more, up or down, are detected. This important result is derived from the nature of the cam surface 75, as well as the fact that pivot screw 62 is self-adjusting up and down in accommodation to different material thicknesses.

Throughout this specification, and in the claims which follow, "detection level" and "sensitivity" are used interchangeably, and refer to the percentage change in thickness which is detected. Of course, it is recognized that the greater the percentage of sensitivity the less is the sensitivity of the detector, and vice versa.

Inspecting FIG. 2, it is seen that the angle of surfaces 75' of cam surface 75, which surfaces contact microswitches 101 and 102 respectively, is a critical variable in determination of the detector sensitivity. Assuming other variables are held constant, when cam 65 is positioned on movable detector arm 64 as illustrated in FIG. 2, it is seen that the more horizontally the surface 75' is inclined, the less will be the sensitivity of the detector, whereas the more vertical the surface, the greater will be the sensitivity. Thus, surface 75''', shown in phantom, will strike switch 102 in response to a smaller change in thickness, whereas slope 75'', also shown in phantom, would require a larger change in material thickness before the cam would activate switch 102. Thus, the detector sensitivity (percentage change of material detected) can be changed by changing the inclination of surfaces 75', and readjusting stops 105 and 106 appropriately.

Given a specific inclination of surface 75', it is noted that as arm 64 is moved upward, in response to a thicker material, a greater angular displacement of cam 65 is required before contact is made with either switch. Similarly, for a downward displacement of arm 64, corresponding to a thiner material, a lesser angular displacement of cam 65 is required before contact with either switch is made. Thus, the sensitivity of the detector, in terms of percentage variation of the thickness of material which is detected, remains substantially constant for varying material thicknesses. As used herein, detection sensitivity and detection level mean the same thing, i.e., the change in relative thickness of the passing material which the detector will detect. Sensitivity, thus, can be expressed as a percentage. In practice, in monitoring the thickness of belt loop strips, it has been found that the range of sensitivity detection can be varied from approximately 10 percent to 85 percent, while maintaining substantially constant sensitivity. It is further noted that the percentage detection, or sensitivity, may be changed either by changing the cam surface slopes 75, moving the cam up or down, and/or changing the lateral extension of the cam. In changing the sensitivity of the detector of this invention, the cam itself may be replaced with a cam of different size and/or shape, or the cam may be made ajustable, such that its cam surface may be changed without replacing the cam.

Figures 3, 4:
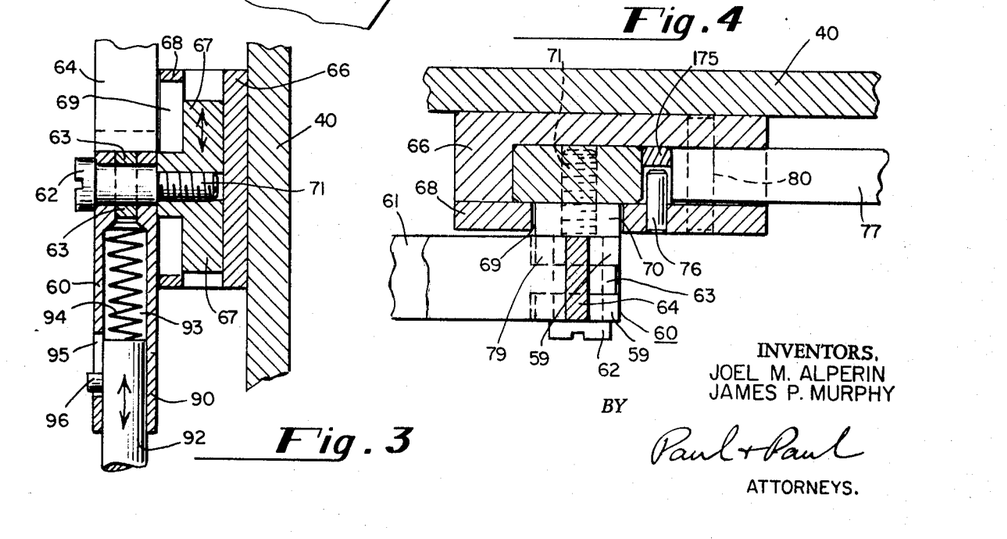
FIG. 3 is an enlarged fragmentary vertical section along lines 3—3 of FIG. 2.
FIG. 4 is an enlarged fragmentary horizontal section along lines 4—4 of FIG. 2.

Still referring to FIGS. 3 and 4, pivot screw 62 has an inner portion 71 of lesser diameter, which extends beyond hinged pieces 59 and 63 toward back plate 40, and threadedly engages a slider block 67 housed within slider block holder 66, which in turn is fixedly attached to plate 40. Two diagonally placed pins 79 prevent angular movement of upper leg 90 with respect to the slider block. A slider block holder cover 68 having rectangular cover opening 69 is connected, as by screws, to the front of slider block holder 66. Slider block 67 has a front extension 70 which extends forward and away from back plate 40 and through opening 69. The extension has a width dimensioned that it just fits within the width of opening 69, thereby permitting slider block 67 to move freely vertically up and down the length of opening 69, but preventing any lateral movement.

To the right of slider block 67, as seen in FIG. 4, is positioned a gib 175, (also seen in FIG. 2) which is a solid rectangular piece, having a flat surface immediately adjacent to the right end of slider block 67. The gib, which is machined to a very close tolerance and made of hardened tool steel, is allowed to move only laterally due to the restraining force of gib pins 76, such that there is no significant friction between the adjacent surfaces. When gib 175 is not pressed against slider block 67, the block is free to move up and down. However, solenoid arm 77, pivoted about solenoid arm pivot pin 80, confronts gib 175 on the other side thereof from the slider block, and has a confronting cam surface comprised of flat portion 81 and arcuate corner portion 82, as seen clearly in FIG. 2. The opposite end of solenoid arm 77 is connected to a normally actuated slider block solenoid 78. When solenoid 78 is actuated, it raises arm 77 so as to pivot arm 77 in a counterclockwise direction, causing flat portion 81 to press against gib 175, which in turn presses against slider block 67 and holds it firmly in place, thereby preventing vertical movement. When solenoid 78 is released, arm 77 is permitted to relax in the clockwise direction to the horizontal position where it is restrained by blocking piece 83, in which position flat portion 81 is parallel to the adjacent surface of gib 175, and exerts no pressure thereon. The tolerance between the gib and the slider block when arm 77 is relaxed is suitably several thousandths of an inch. Thus, only when the solenoid is not actuated is slider block 67 free to move vertically within slider block holder 66.

The movement of stationary leg 60, and pivot screw 62, in response to variations of thickness of the material passing between roller 44 and platform 46, can now be understood. Under normal operating conditions, the electric circuit, as described hereinbelow, provides a signal through leads 88 which activates solenoid 78, causing arm 77 to press against gib 175, thereby restraining the vertical movement of slider block 67. As long as slider block 67 is restrained from vertical movement, pivot screw 62 is held stationary. When pivot screw 62 is held stationary, upper leg 90 of stationary detector roller leg 60 is also held fixed in vertical position. Correspondingly, any vertical movement of roller 44 is translated solely into vertical movement of inner leg 92. Thus, as long as solenoid 78 is actuated, any vertical movement of wheel 44 results only in movement of inner leg 92, as reflected in the movement of pin 96 within opening 95, and the movement of the pivot point through screw 62 is not changed. When, as described hereinbelow, a vertical movement of roller 45 causes de-actuation of solenoid 78, vertical movement of slider block 67 is allowed and the pivot point at 62 is permitted to adjust, at which adjusted position spring 94 causes return of inner leg 92 (and roller 44) to its normal position with respect to screw 62.

The combined operation of stationary leg 60 and movable leg 61 achieves the dual result of detecting thickness variations and adjusting to a new uniform thickness. Uniform, as used herein, is defined as meaning without relative thickness variations which equal or exceed the detection level, or sensitivity, of the detector. Thus, a length of material has a uniform thickness if any variations therein are not large enough to be detected. Leg 61 is caused to move in response to any thickness variation, rotating about normally stationary screw 62. However, when leg 61 does rotate, upper leg 90 of stationary leg 60 is free to adjust vertically, and is again locked in position only when rollers 44 and 45 are at the same level. Thus, where there has been a change in thickness of the monitored strip, pivot screw 62 will assume a new fixed position when, and only when, the material thickness is sensed to be uniform for at least the length comprehended by the distance between rollers 44 and 45. By designing this distance L' to be less than the lengths L being cut, no more than one such length will be rejected prior to readjustment of pivot screw 62, after which cam 65 is centered and succeeding lengths are again passed.

It is to be noted that the detector of this invention may also be adapted to sense minimum and maximum thicknesses. A third microswitch may be fixed in position above the top surface of cam 65, displaced therefrom by the maximum differential thickness which is to be passed. Upon passage of material having a thickness exceeding the set maximum, the third microswitch will be activated. By suitable connection of the output of such third switch with the relay which activates door 56, this door may be held open until the material thickness is again less than the maximum. Similarly, the detector may be adjusted so that if roller 44 drops below a given level, e.g., to platform 46, all lengths are rejected as long as such roller is below a minimum level. This is readily accomplished by proper positioning of switches 101 and 102 with respect to cam 65, so that a given downward displacement of the cam causes actuation of either or both switches.

Figure 5:
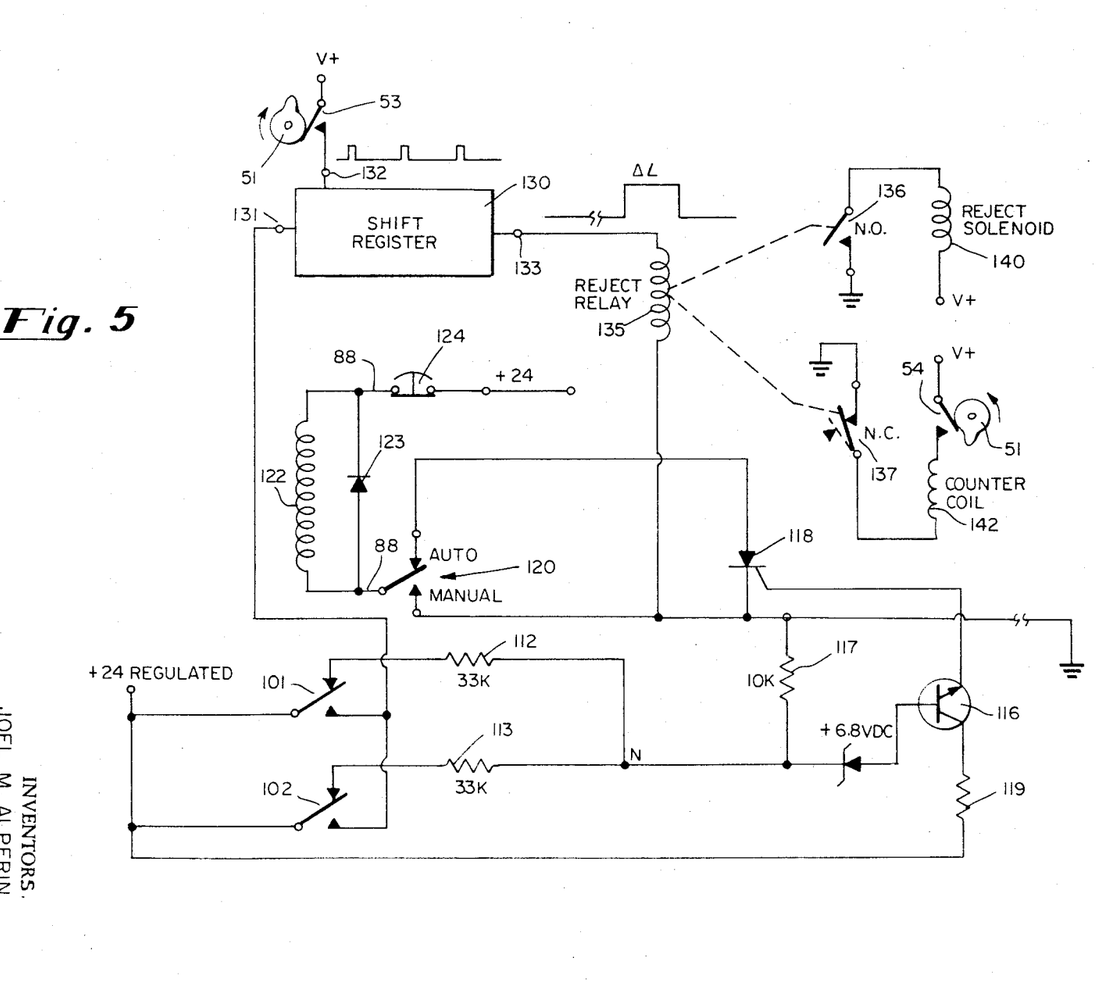
FIG. 5 is an electrical schematic diagram of the control circuit of the detector of this invention.

Referring now to FIG. 5, the circuit diagram there illustrated discloses the manner in which the detector translates sensed differences in thickness into signals which operate control door 57, modify the count of accepted pieces, and permit adjustment of the position of pivot screw 62 so that the detector may adapt to a different uniform thickness of material. Microswitches 101 and 102 are shown as two-position switches, with the common point of each connected to a standard regulated 24 volt supply. Switch 101 normally provides a connection through resistor 112 to a node point N, and switch 102 normally provides connection through resistor 113 to node point N. Node point N is connected through a resistor 117 to ground, and through a zener diode 115 into the base of transistor 116. Transistor 116 has its collector connected to the 24 volt source, and its emitter is connected to the gate of an SCR 118. The cathode of SCR 118 is connected to ground, and the anode is normally connected through switch 120 to one terminal of detector solenoid coil 122, the other terminal of which is connected through normally closed push button switch 124 to a 24 volt supply.

In practice, resistors 112 and 113 are each suitably 33 K, resistor 117 is 10 K, and zener diode 115 conducts when back biased by about 6.8 volts DC. Thus, with each microswitch as shown in FIG. 5, representing the case where neither switch has been contacted by cam 65, the voltage across resistor 117 exceeds 6.8 volts DC, thereby causing zener diode 115 to conduct, which turns on transistor 116. With transistor 116 turned on, sufficient current passes through the gate of SCR 118 to maintain it on, such that appreciably 24 volts is placed across relay coil 122, thereby actuating solenoid 78. Thus, as described hereinabove, solenoid 78 is generally actuated, such that movement of slider block 67 is restrained. In these circumstances, with the pivot point of screw 62 in a fixed position, any vertical movement of roller 45, up or down, causes an angular displacement of arm 64. This in turn causes a corresponding displacement of cam 65 so as to trigger either microswitch 101 or 102. As is seen from the diagram of FIG. 5, if either of these switches is switched, one of the 33 K resistors is taken out of the circuit, thereby increasing the voltage drop across the other 33 K resistor and reducing the voltage across resistor 117 to an extent such that zener diode 115 does not conduct. Without diode 115 conducting, transistor 116 turns off, so that SCR 118 cannot conduct. Under these circumstances, there is no closed circuit permitting current through solenoid coil 122, causing solenoid 78 to release and removing the sidewise pressure on slider block 67. This, of course, permits vertical movement of pivot screw 62 in response to a thickness change in the material. When pivot point 62 moves to a new position, arm 64 returns to the vertical, and the microswitch which had been turned on returns to its normal position, whereupon solenoid 78 is again actuated, thereby locking slider block 67 and holding pivot point 62 at a new position.

Switch 120, as illustrated, is normally in the "AUTO" position, such that contacting switching of either microswitch 101, 102 automatically causes interruption of the current through coil 122. When switch 120 is placed in "MANUAL," solenoid 78 will only release when the operator depresses switch 124. By this means, an operator can, if desired, assume complete manual control of the passing or rejecting of cut loop lengths.

Still referring to FIG. 5, switches 101 and 102 are connected to the signal input terminal 131 of shift register 130, so that 24 volts is connected to terminal 131 when cam 65 causes switching of either microswitch. Shift register 130 may be any suitable commercially available shift register, designed to register the receipt of any signal at signal input terminal 131, and to shift any such registered signal through successive stages each time a shift signal is coupled to shift signal terminal 132. Cam 51 operates to close switch 53 coincident with the beginning of each length of material which is to be cut, such that for each such length the contents of the shift register are shifted one stage toward output terminal 133. It is readily seen that by placing an appropriate number of stages in register 130, the length of time it takes to produce an output at output terminal 133 may be adjusted correspondingly. In this application, this period of time for shifting through register 130 corresponds to the period of time taken up in passage of the material from detector 41 to cutter 48.

In accordance with the operation of register 130, any time either switch 101 or 102 is switched by cam 65 during one measured length, an output signal will appear at terminal 133, which is connected through reject relay 135 to ground. This signal lasts for a time duration ΔL corresponding to the passage past the detector of one loop length L. Thus, if any imperfection which has a variance of thickness such as to cause cam 65 to activate either switch occurs during the passage of one loop length, reject relay 35 is activated. This activation is delayed corresponding to the passage of the entire loop length past hinged door 57. This is achieved by equating the time of passage of the length of material from roller 45 to door 57, to the time it takes to shift the signal through register 130. When reject relay 135 is actuated, normally open switch 136 is closed, providing a closed circuit through reject solenoid 140. This actuates door 57, such that the loop length carrying the thickness imperfection is not permitted to pass to the receiving retainer, but is dropped through opened door 57 and discarded. At the same time, relay 135 switches open normally closed switch 137, which is in series with counter coil 142. Connected in series with counter coil 142 is switch 54, which is closed once each cycle by cam 51 mounted on rotating shaft 50. Since switch 54 is mounted on the opposite side of shaft 50 from switch 53, it is closed at the middle of period ΔL for each loop length which is cut. In the absence of any signal through relay 135, counter coil 142 is actuated for each passing loop length, such that the counter normally counts every loop length cut by cutter 48. However, if a loop length is rejected, relay 135 is actuated at the beginning of the loop length, so that when cam 51 closes switch 54 at approximately the middle of the loop length cycle, counter coil 142 is not actuated. In this manner, only the accepted loop lengths are counted, enabling accurate counting of all loop lengths which pass the detector.

The operation of the switch action in response to detected thickness differences, as well as the adjustment feature of the detector, is seen from the illustrated sequence provided in FIG. 6. In part A of FIG. 6, stationary detector roller leg 60, movable detector roller leg 61, movable detector arm 64 and cam 65 are shown in solid lines for the circumstance where no material is passing between rollers 44 and 45, and platform 46. The solid line positions shown in part A are equally illustrative of the situation as shown where material having a differential thickness has passed underneath roller 44, with a discontinuity as at leading edge E between the two rollers. Under these circumstances, pivot screw 62 is at a vertical height as designated by dashed line H, the solenoid is activated and consequently arm 77 causes gib 175 to be firmly pressed against slider block 67. Leading edge E of the material M having passed under roller 44, inner leg 92 is raised against spring 94, as seen by the raised position of protruding pin 96. After leading edge E passes under roller 45, as shown in phantom, movable leg 61 is displaced upward, causing a clockwise rotation of arm 64, and causing detector cam 65 to rotate to the right, also as shown in phantom. Such rotation activates microswitch 101, which releases solenoid 78 and permits upward movement of slider block 67, and readjustment upward of pivot screw 62. The new, readjusted position is shown in part B of FIG. 6, where pivot screw 62 is illustrated to have moved upward from vertical line H, and detector arm 64 has returned to its normal vertical position. Also note that pin 96 has returned to the bottom of slot opening 95, due to the pressure of spring 94. Thus, in this position, both rollers 44 and 45 have been elevated by the increased thickness of the material, and the detector mechanism has readjusted to a new position. As long as the advancing material remains at its new thickness, the detector mechanism senses no change in thickness, and produces no reject signals. By this means, it is seen that the detector mechanism is able to adapt to a change in thickness, without thereafter continuously "detecting" an unwanted thickness. It is also seen that as long as the distance L' between rollers 44 and 45 is less than length L, only that loop length containing leading edge E will be rejected.

Referring now to part C of FIG. 6, the situation is illustrated where the trailing edge T of the material has advanced beyond roller 44, but has not yet passed under roller 45. In this situation, shown in solid lines in part C, roller 44 remains elevated above platform 46, due to the fact that there has been no rotation of arm 61, and no consequent rotation of detector arm 64 or operation of either of the microswitches. Thus, the solenoid 78 remains actuated, and pivot point 62 is held in its same position as illustrated, above line H. Roller 44 cannot move downward because pin 96 is held at the bottom of opening 95. However, when and as the trailing edge T passes beyond the roller 45 (as shown in phantom), movable leg 61 rotates counterclockwise around pivot screw 62, causing displacement of cam 65 to the left, and switching of microswitch 102. Switching of switch 102 again cuases de-actuation of solenoid 78, permitting movement of slider block 67 and pivot screw 62. Under these circumstances, there being no support underneath roller 44, it drops to its lower limit as provided by platform 46, as illustrated in part D. When the position shown in part D is achieved, the two microswitches are again in their normal positions, solenoid 78 returns to its normally actuated condition, and pivot screw 62 is again locked at level H, as it was in part A before the material M approached the detector.

From the above, it is seen that the apparatus as disclosed achieves the primary objectives of the invention. Whenever the material being monitored exhibits a variation in thickness which is greater than the permissible tolerance, the detector senses such variation and causes generation of an electrical signal which in turn drives a door or similar means so as to prevent passage of the rejected loop length. Similarly, the apparatus is constructed to be self-adjusting to any new uniform thickness of material. The detector of this invention adjusts within one predetermined length of material, so that the first full length of material possessing the new uniform thickness is permitted to pass and be retained. In this manner, only those lengths of material which within themselves possess variations of thickness will be rejected.

The economic benefits of the invention of this application have been clearly observed in its operation as a bad belt loop detector. Not counting the savings due to avoidance of damages garments, each such detector as described hereinabove provides a sufficient labor saving such that it can be ammortized in a year's time where the machine is kept running all day. Further, it has been verified that the increase of productivity in loop making, contributed by the use of one such machine, is approximately 75 percent. In the bad belt loop detecting operation, the apparatus provides the following specific advantages:

a. an accurate count of good loops;
b. no operator, or worker, is required to pick up, inspect or dispose of bad loops;
c. bad loops which otherwise would not be detectable by human observation (e.g., overlapped loops) are detected;
d. machine down time subsequent to the loop cutting, as on the loop setting and loop-tacking-down operations, is reduced significantly due to fewer broken needles;
e. loop makers are trained with greater ease;
f. less loop material is required to produce a given number of loops.

While the operation of the apparatus of this invention has been described in the environment of operating on trouser belt loop material, and specific advantages resulting therefrom have been detailed, it is obvious to one generally trained in the industrial arts that the apparatus is adapted to many other industrial applications wherein it is capable of providing similar advantages.

We claim:

1. Detector apparatus for detecting thickness variations of a continuous strip of material being passed through said apparatus, comprising:
   a. thickness variation detecting means, for detecting thickness variations of said passing material with respect to a material thickness reference and having a cam mounted on a rotatable arm, and switch means positioned operatively adjacent to said cam, said rotatable arm being responsive to the thickness of said passing material, said cam actuating said switch means when said thickness variations are detected, said detector sensitivity being a function of the shape of said cam and the position of said cam on said rotatable arm;
   b. automatic thickness reference adjusting means to adjust said material thickness reference to correspond to any thickness of said passing material which is uniform for at least a predetermined length, said detecting means and said reference adjusting means cooperating to provide a thickness detection sensitivity which is substantially constant for varying thicknesses and substantially independent with respect to said thickness reference; and
   c. signal generating means actuated by said thickness variation detecting means for generating electrical signals in response to detected thickness variations, and material operating means connected to and responsive to said signals for operating on said passing material.

2. The apparatus as described in claim 1, wherein said rotatable arm is substantially normal with respect to said passing material when said passing material is uniform in thickness, and said switch means comprises a pair of switches positioned symmetrically with respect to said arm when in said normal positon.

3. The apparatus as described in claim 2 comprising a movable detector roller leg to which said rotatable arm is integrally connected, and comprising a stationary detector roller leg, said movable roller leg being pivotable with respect to said stationary roller leg at a pivot point common to said two legs.

4. The apparatus as described in claim 3, wherein said automatic thickness reference adjusting means comprises a slider block, a gib positioned contiguous to said slider block and normally maintained in frictional contact therewith, said pivot point being integrally connected to said slider block.

5. The apparatus as described in claim 4 wherein said stationary detector leg is non-rotatable with respect to said pivot point, and exerts a force on said pivot point in response to changes in thickness of said passing material, which force tends to force said pivot point up or down in response to upward or downward variation in said thickness.

6. The apparatus as described in claim 5 comprising a cam arm normally bearing upon said gib, and a solenoid operatively connected to said signal generating means to hold said arm so as to normally maintain said gib in frictional contact with said slider block when no thickness variation is sensed, and to release said arm so that said slider block is free to move in response to the force of said movable detector leg when a thickness variation over said predetermined length is detected, thereby permitting adjustment of said pivot point and corresponding adjustment of said thickness reference.

7. The apparatus as described in claim 6 comprising delay means operatively connected to said signal generating means, and connected to said material operating means so as to cause said passing material to be operated upon at a given time delay after a thickness variation is detected.

8. The apparatus as described in claim 7, wherein said material is a continuous strip of belt loop material, and wherein said operating means comprises a cutter for cutting predetermined loop lengths of said material, and reject means controlled from said delay means for rejecting any such predetermined loop lengths having detected thickness variations.

9. The apparatus as described in claim 6, wherein said movable detector roller leg and said stationary detector roller leg are carried by and connected to a movable detector roller and stationary detector roller respectively, said rollers being spaced apart by said predetermined length.

10. Detector apparatus for detecting relative thickness variations of a continuous strip of material being passed through said apparatus, comprising:
 a. movable detector means in contact with said passing material and responsive to the thickness of said material at a first position;
 b. stationary detector means positioned in contact with said passing material and positioned at a second position spaced from said first position by at least a first predetermined length, and normally unresponsive to thickness variations of said passing material;
 c. a movable detector arm integrally connected to said movable detector means, said movable detector means being pivotably connected to said stationary detecting means at a pivot point;
 d. a cam mounted on said movable detector arm, and switch means located on respective opposite sides of said cam, said switch means being adapted to generate a signal when contacted by said cam;
 e. solenoid-actuated pivot point control means, connected to and responsive to said switch means, to maintain said pivot point in a normally fixed position, and to permit displacement of said pivot point upon receipt of a signal from said switch means, thereby permitting said pivot point to adjust in position responsive to the thickness of said passing material at the position of said stationary detector means; and
 f. the shape of said cam, the position of connection of said cam to said movable arm, and the position of said switch means with respect to said cam cooperating to provide a detection sensitivity substantially independent of the thickness of said passing material.

11. The apparatus as described in claim 10, wherein said movable detector means comprises a movable detector leg mounted on and connected to a movable detector roller, and said stationary detector means is mounted on and connected to a stationary detector roller.

12. The apparatus as described in claim 11, wherein said pivot point control means comprises a slider block, a gib positioned contiguous to said slider block and normally maintained in frictional contact therewith, said pivot point being integrally connected to said slider block, a normally energized solenoid connecting to said switch means, and a solenoid arm operatively controlled by said solenoid and normally engaging said gib, said switch means causing de-energization of the solenoid and release of the gib from frictional contact with said slider block when said cam contacts said switch means, thereby allowing free movement of the slider block and adjustment of the pivot point to a new position.

13. The apparatus as described in claim 12, comprising cutting means for cutting said continuous strip of material into predetermined lengths after same has been passed by said rollers, reject means for rejecting any of said cut lengths having a detected thickness variation in excess of a predetermined detection level, and time-delay circuitry connected to said switch means and operatively connected to said reject means, for actuating said reject means a predetermined time period after detection of said any cut lengths.

14. The apparatus as described in claim 13, wherein said predetermined length is greater than the length between said movable detector roller and said stationary detector roller.

15. The apparatus as described by claim 10, wherein said switch means comprises a pair of switches, each switch located on a respective opposite side of said cam, said switches being pivotably mounted and adapted to have an override property such that each such switch moves in the direction of the movement of said cam when said cam moves a distance further than that required to make contact with such switch.

16. The apparatus as described in claim 10, wherein said movable arm is normally held substantially perpendicular to the passing strip of material, the stationary leg is aligned axially with said movable arm when in said normally perpendicular position and is held non-rotatable about said pivot point;

said stationary leg has a first movable portion responsive to the thickness of said passing material and a second portion non-rotatably connected to said pivot point, said first portion being movable within a cavity in said second portion and being restrained from movement therein by a spring, which spring exerts a force on said pivot point in response to thickness variations of said passing material.

17. The apparatus as described in claim 10, wherein said cam has a cam surface with switch-contacting segments spaced symmetrically with respect to said movable detector arm, and said switch means comprises a pair of switches, each switch being located on a respective side of said cam, and equidistant from respective cam surface segments when the portion of said passing material being detected is uniform in thickness.

18. Apparatus for cutting short fixed lengths of material from a continuously moving strip of material fed through said apparatus, and for collecting such lengths having thickness variations within a predetermined detection level and rejecting any such lengths having thickness variations equal to or in excess of such detection level, comprising:
 a. movable detector means in contact with said passing material and responsive to the thickness of said material at a first position;
 b. stationary detector means positioned in contact with said passing material and positioned at a second position spaced from said first position by at least a first predetermined length, and normally unresponsive to thickness variations of said passing material;
 c. a movable detector arm integrally connected to said movable detector means, said movable detector means being pivotably connected to said stationary detecting means at a pivot point;
 d. a cam mounted on said movable detector arm, and switch means located on respective opposite sides of said cam, said switch means being adapted to generate a signal when contacted by said cam;
 e. solenoid-actuated pivot point control means, connected to and responsive to said switch means, to maintain said pivot point in a normally fixed position, and to permit displacement of said pivot point upon receipt of a signal from said switch means, thereby permitting said pivot point to adjust in position responsive to the thickness of said passing material at the position of said stationary detector means;
 f. cutting means, positioned in registry with the path of said passing length of material after it has passed said movable detector means and stationary detector means, for cutting said passing material into said short lengths;
 g. reject means, for capturing said any such short lengths; and
 h. electronic control means, operatively coupling said switch means with said reject means, to control rejection of said any such short lengths.

19. The apparatus as described in claim 18, wherein said material comprises sewn fabric material.

20. The apparatus as described in claim 1, wherein said cam slope is asymmetrical.

21. The apparatus as described in claim 1, wherein said switch means comprises a pair of switches positioned asymmetrically with respect to said arm when in said normal position.

22. Detector apparatus for detecting thickness variations of a continuous strip of material being passed through said apparatus, comprising:
 a. thickness variation detecting means, for detecting thickness variations of said passing material with respect to a material thickness reference and having a cam mounted on a rotatable arm, and switch means positioned operatively adjacent to said cam, said rotatable arm being responsive to the thickness of said passing material, said cam actuating said switch means when said thickness variations are detected, said detector sensitivity being a function of the shape of said cam and the position of said cam on said rotatable arm; and,
 b. automatic thickness reference adjusting means to adjust said material thickness reference to correspond to any thickness of said passing material which is uniform for at least a predetermined length.

23. The apparatus as described in claim 22 wherein said detecting means and said reference adjusting means cooperate to provide a thickness detection sensitivity which is substantially constant for varying thicknesses and substantially independent with respect to said thickness reference.

24. The apparatus as described in claim 23 comprising signal generating means actuated by said thickness variation detecting means for generating electrical signals in response to detected thickness variations, and material operating means connected to and responsive to said signals for operating on said passing material.

* * * * *